United States Patent Office 3,725,261
Patented Apr. 3, 1973

3,725,261
REMOVAL OF MERCURY FROM LIQUIDS USING KERATIN DERIVATIVES
Mendel Friedman, Moraga, Calif., assignor to the United States of America as represented by the Secretary of Agriculture
No Drawing. Filed Nov. 5, 1971, Ser. No. 196,174
Int. Cl. C02c 5/02
U.S. Cl. 210—38                    3 Claims

ABSTRACT OF THE DISCLOSURE

Mercury is effectively removed from water or other liquids by contact with a keratin derivative, e.g., reaction products of reduced wool with N-vinylimidazole, N-vinylpyrrolidone, or 2-vinylpyridine.

---

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to and has among its objects the provision of a new method for removing mercury from water or other liquids, e.g., milk, fruit juices, and other potable liquids. Further objects of the invention will be evident from the following description wherein parts and percentages are by weight unless otherwise specified.

In the following description emphasis is directed to utilization of the process of the invention for removing mercury from water. It will be understood that this particular application of the invention is provided by way of illustration, not limitation. In its broad ambit the invention can be utilized for removing mercury from any liquid, e.g., milk, fruit juices, vegetable juices, or other potable liquids.

The law of conservation of matter states that matter cannot be created or destroyed. Thus, the total amount of mercury on and in the earth, whether in elemental, ionic, or organic form, is constant. Mercury is found naturally in the oceans, seas, mines, rivers, lakes, mountains, etc. The mercury problem, therefore, is not one of existence but one of concentration and toxicity. It is the high toxicity of mercury compounds, especially methyl mercury, which makes the discharge of mercury into surface and ground waters so dangerous. The accumulation of mercury in particular areas results for the most part from man's use of this element in fungicides, insecticides, pharmaceuticals, etc. For instance, although the United States produces only ⅛ of the total world production of mercury, it uses ⅓ of the total world production. The discharge of industrial mercury wastes into rivers and lakes results in high concentrations of mercury in relatively small areas. Industry is faced with the task of disposing of mercuric wastes without expulsion into waterways.

Living organisms can tolerate mercury in minute concentrations without any toxic effects. However, there are certain bacteria in the mud and silt of our waters which readily convert both elemental and ionic mercury to methyl mercury. This form of mercury is water soluble and is readily ingested by plants, algae, lower forms of animal life, and, finally, by fish who feed on the aforementioned. In addition, methyl mercury is directly absorbed into the bodies of fish through the gills. The problem is this: Fish concentrate methyl mercury in their kidneys, liver, and their edible portions. Thus, a harmless situation becomes extremely hazardous. Fish can also directly transform elemental and ionic mercury to methyl mercury within their bodies. From these contaminated fish, mercury moves along to birds, chickens, etc., and ultimately, to man. As the mercury moves along in the food chain, it becomes more and more concentrated.

In humans mercury accumulates in the brain, kidney, liver, hair, blood, and the fetus of pregnant women. In severe cases the damage caused is irreversible. Because mercury destroys the cells of the brain, permanent damage to the central nervous system results. The proposed mercury standard for drinking water in the United States is 0.005 part per million. Brain damage can result from 20 parts per million, and this concentration may start a process leading to paralysis and death.

The invention described herein provides a means for obviating the problems outlined above. In accordance with the invention, water containing mercury is contacted with a keratin derivative, whereby the mercury is removed from the water. In a typical practice of the invention, the mercury-containing water is passed through a bed of the keratin derivative contained in any suitable vessel. The effluent, no longer contaminated with mercury, can then be reused, for example, in industrial processes, or it can be deposited in a river, lake, or stream without contaminating such water course.

In the process of the invention, the keratin derivative acts as an absorbent in that mercury dissolved in the entering water as inorganic or organic compounds becomes bound to the keratin. The action is thus not a mere matter of filtration, but one believed to involve chemical combination between the dissolved mercury and the keratin. Of course, if the entering water should contain undissolved mercury—such as suspended particles of elemental mercury—these will be removed by physical entrapment.

The keratin derivatives used in accordance with the invention are products prepared by reacting a keratin, in reduced form, with a nitrogen-containing vinyl monomer such as N-vinylimidazole, N-vinylpyrrolidone, or 2-vinylpyridine. The keratin may be wool, animal hair, poultry feathers, animal horn or hoof, scales, or the like.

Reduction of the keratin can be effected in various ways well known in the art. These include, but are not limited to, treatment with thioglycollic acid, tri-n-butylphosphine, and the like. Typical procedures for reducing keratins are disclosed, for example, in the following U.S. Pats.: Harris 2,434,562; Haefele et al. 2,615,783; Moore et al. 2,850,351; and Moore 2,933,365. After the keratin has been reduced it is reacted with the nitrogen-containing vinyl monomer. This involves contacting the reduced keratin in the presence of an alkaline substance with the vinyl monomer, the latter being preferably dissolved in an inert solvent such as water, an alcohol such as methanol, ethanol, isopropanol, n-propanol, blends of water and any of said alcohols, etc. To provide the alkaline conditions there is added to the reaction system a moderately alkaline material such as an alkali metal acetate or bicarbonate, an amine such as pyridine, dimethyl aniline, quinoline, or tris—an abbreviated name for tris-(hydroxymethyl) aminomethane. Usually, enough of the alkaline material is added to provide a pH of about 7.5 to 10.

Usually as a matter of convenience, the reaction is conducted at room temperature. However, the temperature may, in general, be from about 20 to 100° C., the rate of reaction increasing as the temperature is increased.

It is preferred to exclude atmospheric oxygen from the reaction system and such exclusion is readily attained by sweeping a non-oxidizing gas such as nitrogen or helium through the system.

The amount of vinyl monomer taken up by the keratin may be varied by adjustment of such factors as the proportion of monomer to rduced keratin in the reaction system, the temperature, the time of reaction, etc. In general, the reaction conditions are selected so that the reduced keratin takes up about 5 to 50% (on dry basis) of vinyl monomer.

After the reaction of the reduced keratin and vinyl monomer has been carried out, the modified keratin product is treated to removed unreacted materials, solvent, etc. by the usual treatments such as wringing, pressing, or centrifuging, preferably in combination with rinsing or washing. The product is then dried and is ready for use.

In a preferred embodiment of the invention, wool is reduced and reacted with a vinyl monomer as disclosed. The resulting product retains the same physical form as the initial wool. For instance, starting with wool in the form of a fabric, the final product will retain its identity as a fabric. Thus, it can be formed by conventional operations such as cutting and sewing into suitable shapes, for example, those of conventional filter cloths. In the application of the process of the invention, these cloths can be inserted in a conventional filtering apparatus and the water to be purified passed therethrough.

It is obvious that in a continued operation of the process of the invention, there will come a point when the absorbent has taken up so much mercury that it loses its effectiveness. The absorbent can then be treated to recover its content of mercury and to recondition the absorbent so it can be used further. This may be done by repeated washing of the spent absorbent with an aqueous solution of a salt such as sodium chloride, or more preferably one which exhibits chelating ability, e.g., sodium ethylenediaminetetraacetate, sodium citrate, or sodium mercaptoacetate.

The primary advantage of the invention is that the discharge and accumulation of mercury in waterways is prevented. Thus, a source of mercury for conversion to its methylated derivative is reduced considerably. Natural forces can now act to redistribute the accumulated mercury so that its concentration in a particular area is reduced below the danger level.

Another advantage of the invention lies in the fact that it can easily be adapted to present water purification systems, whether industrial or municipal. Since most water purification systems involve a filtration procedure, the addition of an extra filter containing a keratin derivative would be routine.

Still another advantage of the invention is that metallic mercury can be recovered from the process. Thus, the cost of installation of the filtration system on an industrial level can be defrayed by the amount saved in reusing the recovered mercury.

A particular advantage of the invention is that the keratin derivatives are effective to absorb mercury even where the water under treatment contains minute proportions of dissolved mercury, for example, concentrations in the parts-per-billion range. Also, the keratin derivatives have the ability to absorb a large proportion of mercury. Our experiments have shown that the keratin derivatives will absorb up to 80% of their own weight of mercury, whereas untreated wool will absorb at best one-half its weight of mercury.

The invention can be implemented on an industrial or municipal level in various ways. One can employ a gravity flow system or one wherein the water to be purified is pumped upwardly through a vessel containing the keratin derivative. The keratin material can be provided in textile or other fibrous form where it is derived from wool or other keratin which naturally occurs in a fibrous state. Where the keratin derivative is derived from hoof, horn, or the like, it may be employed in the form of granules, flakes, or the like. To prevent packing, the keratin material may be admixed with a dispersing material such as coke, charcoal, sand, gravel, or the like, and the mixture placed in a suitable vessel such as a column equipped with inlet for contaminated water and an outlet for purified water.

The keratin derivatives used in accordance with the invention provide several special advantages. One item is that they present an increased number of binding sites (due to incorporation of nitrogen) available for combining with mercury. Moreover, they are stable; they are not changed by exposure to air. Accordingly, they retain their absorption properties. In contrast, reduced keratins per se are not stable; when exposed to air they gradually revert to the native keratin and their absorption properties are decreased.

EXAMPLES

The invention is further demonstrated by the following illustrative examples.

Some of the experiments described in the examples are not representative of the invention; they are included for purpose of comparison.

EXAMPLE 1

Preparation of Keratin derivatives

Reduced wool was prepared by treating 10 g. of wool with 4 ml. of tri-n-butylphosphine in a mixture of 350 ml. of pH 7.8 tris buffer and 350 ml. of n-propanol, and shaking the mixture for 2 days at room temperature under nitrogen. After this period, 4 ml. of 2-vinylpyridine was added to the mixture containing reduced wool. The system was flushed with nitrogen and shaken at room temperature for an additional 2 days.

The modified wool was removed from the mixture, washed with water, and air-dried.

Reduced wool modified with other vinyl monomers were prepared as described above, replacing the 2-vinylpyridine by N-vinylimidazole and N-vinylpyrrolidone, respectively.

EXAMPLE 2

Mercury absorption tests

Samples of the keratin derivatives prepared in Example 1 and a sample of untreated wool were tested for their ability to absorb mercury, using the following procedure in each case.

One gram of the keratin material was treated with 100 ml. of 0.2 M aqueous mercuric chloride soultion for 24 hours at room temperature. The keratin material was then removed from the solution, washed thoroughly, and analyzed for mercury by atomic absorption technique.

The results obtained are tabulated below:

| Sample | Modifying agent | Mercury absorbed grams of Hg per gram of keratin |
|---|---|---|
| 1 | N-vinylimidazole | 0.6 |
| 2 | N-vinylpyrrolidone | 0.7 |
| 3 | 2-vinylpyridine | 0.8 |
| Control | None (untreated wool) | 0.5 |

EXAMPLE 3

Mercury absorption tests

In this example the most effective keratin studied (the 2-vinylpyridine derivative) was compared with native and reduced wool. The use of native and reduced wool in this example is by way of comparison only; they form no part of the present invention.

In runs $a$, $b$, and $c$, 1 g. of the keratin material was treated with 50 ml. of $5 \times 10^{-4}$ M (100 p.p.m.) aqueous mercuric chloride solution for 24 hours at room temperature. The keratin material was then removed from the solution, washed thoroughly, and analyzed for mercury by an atomic absorption technique. Runs $d$, $e$ and $f$ were the same as above except that a $5 \times 10^{-3}$ M aqueous mercuric chloride solution was used. The results are summarized below.

| Run | Absorbent | Concentration of mercury in solution, p.p.m. Initial | Final | Amount of mercury absorbed by keratin material, p.p.m. |
| --- | --- | --- | --- | --- |
| a | Native wool | 100 | 1.8 | 98.2 |
| b | Reduced wool | 100 | 0.1 | 99.8 |
| c | Reaction product of reduced wool and 2-vinylpyridine. | 100 | 0.3 | 99.7 |
| d | Native wool | 1,000 | 225 | 775 |
| e | Reduced wool | 1,000 | 1 | 999 |
| f | Reaction product of reduced wool and 2-vinylpyridine. | 1,000 | 16 | 984 |

Having thus described the invention, what is claimed is:

1. A process for removing dissolved mercury from water containing the same, which comprises contacting said water with the reaction product of a reduced keratin and 2-vinylpyridine.

2. A process for removing dissolved mercury from water containing the same, which comprises contacting said water with the reaction product of a reduced keratin and N-vinylimidazole.

3. A process for removing dissolved mercury from water containing the same, which comprises contacting said water with the reaction product of a reduced keratin and N-vinylpyrrolidone.

References Cited

Chemical Abstracts, vol. 53, 1959, 4745b (P.O.S.L.).
Chemical Abstracts, vol. 55, 1961, 9428i (P.O.S.L.).

MICHAEL ROGERS, Primary Examiner

U.S. Cl. X.R.

75—101 BE; 210—59; 260—112